US008234694B2

(12) United States Patent
Youn et al.

(10) Patent No.: US 8,234,694 B2
(45) Date of Patent: Jul. 31, 2012

(54) METHOD AND APPARATUS FOR RE-ESTABLISHING COMMUNICATION BETWEEN A CLIENT AND A SERVER

(75) Inventors: Paul Youn, Redwood City, CA (US); Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1647 days.

(21) Appl. No.: 11/298,775

(22) Filed: Dec. 9, 2005

(65) Prior Publication Data

US 2007/0136795 A1 Jun. 14, 2007

(51) Int. Cl.
H04L 29/06 (2006.01)

(52) U.S. Cl. ............................ 726/5; 713/156; 713/171

(58) Field of Classification Search ...... 726/5; 713/150, 713/156, 171; 705/51
See application file for complete search history.

(56) References Cited

U.S. PATENT DOCUMENTS

| | | | | |
|---|---|---|---|---|
| 6,016,476 A | * | 1/2000 | Maes et al. | ........................ 705/1 |
| 6,055,637 A | * | 4/2000 | Hudson et al. | ................... 726/20 |
| 6,144,849 A | | 11/2000 | Nodoushani | |
| 6,381,454 B1 | | 4/2002 | Tiedemann, Jr. | |
| 6,466,779 B1 | | 10/2002 | Moles | |
| 6,529,729 B1 | | 3/2003 | Nodoushani | |
| 6,549,770 B1 | | 4/2003 | Marran | |
| 6,577,614 B1 | | 6/2003 | Cook | |
| 6,622,017 B1 | | 9/2003 | Hoffman | |
| 6,625,451 B1 | | 9/2003 | Medica, Jr. | |
| 6,725,056 B1 | | 4/2004 | Moles | |
| 6,845,092 B2 | | 1/2005 | Vassilovski | |
| 7,318,236 B2 | * | 1/2008 | DeMello et al. | ................ 726/26 |
| 2002/0010679 A1 | * | 1/2002 | Felsher | ........................... 705/51 |
| 2002/0184349 A1 | * | 12/2002 | Manukyan | .................... 709/221 |
| 2003/0163686 A1 | * | 8/2003 | Ward et al. | .................... 713/156 |
| 2004/0123151 A1 | * | 6/2004 | Mizrah | ......................... 713/201 |
| 2004/0236939 A1 | * | 11/2004 | Watanabe et al. | ............. 713/150 |
| 2004/0242209 A1 | * | 12/2004 | Kruis et al. | ................ 455/414.1 |
| 2005/0125669 A1 | * | 6/2005 | Stewart et al. | ................ 713/171 |
| 2005/0254653 A1 | * | 11/2005 | Potashnik et al. | ............ 380/270 |
| 2007/0003062 A1 | | 1/2007 | Mizikovsky | |
| 2007/0130617 A1 | * | 6/2007 | Durfee et al. | ...................... 726/5 |
| 2008/0064367 A1 | | 3/2008 | Nath | |

* cited by examiner

Primary Examiner — Hadi Armouche
(74) Attorney, Agent, or Firm — Shun Yao; Park, Vaughan, Fleming & Dowler LLP

(57) ABSTRACT

One embodiment of the present invention provides a system that re-establishes communication between a client and a server after an unexpected termination of communication. During operation, the system receives a request from the client at the server to re-establish communication between the client and the server, wherein the request includes a temporary credential. If the temporary credential is valid, the system temporarily re-establishes communication between the client and the server, until the client can be re-authenticated with a permanent credential.

20 Claims, 4 Drawing Sheets

METHOD AND APPARATUS FOR RE-ESTABLISHING COMMUNICATION BETWEEN A CLIENT AND A SERVER

BACKGROUND

1. Field of the Invention

The present invention relates to distributed computer systems. More specifically, the present invention relates to a method for re-establishing communication between a client and a server after an unexpected termination of communication between the client and the server.

2. Related Art

Because of security concerns, organizations often encrypt their data and require authentication of clients before the clients can communicate with a server, a network, or a database.

During normal system operation, there is always a chance that a computer system will crash or abruptly lose communication with a server or a database. This can occur for any number of reasons, including denial-of-service attacks, hardware failures, application errors, and power outages. Usually, after an unexpected loss of communication, an administrator attempts to restore all computer systems to normal operation. Typically, this involves re-authenticating the systems that have lost communication to the server, network, or database.

Unfortunately, users cannot control when a system will crash or lose communication with a server. Furthermore, because of security concerns, the ability to restore a system to normal operation is typically limited to a select few individuals. Consequently, if a crash or loss of communication occurs during the night, when the administrator is on vacation, or when the administrator is in an important meeting, it may not be possible to restore a system to normal operation in a timely manner. This downtime can be extremely costly to an organization that relies on availability of its computer systems.

Hence, what is needed is a method for providing both system security and system availability.

SUMMARY

One embodiment of the present invention provides a system that re-establishes communication between a client and a server after an unexpected termination of communication. During operation, the system receives a request from the client at the server to re-establish communication between the client and the server, wherein the request includes a temporary credential. If the temporary credential is valid, the system temporarily re-establishes communication between the client and the server, until the client can be re-authenticated with a permanent credential.

In a variation of this embodiment, the system configures the server. By generating a permanent credential, wherein the permanent credential is used to determine whether the client is authorized to establish communication with the server. Next, the system creates a temporary credential profile template. Finally, the system secures access to the permanent credential so that the permanent credential is restricted to a subset of users.

In a further variation, a temporary credential profile template can include: a communication time-limit defining how long communication can last before requiring the client to use the permanent credential to authenticate with the server; a usage time-limit defining how soon the temporary credential must be used after the unexpected termination of communication; an expiration value defining how long a temporary credential profile is valid before a new temporary credential profile must be created; an authentication-field defining what authentication-information must be provided by the client attempting to re-establish communication when using the temporary credential; a format for an alert message alerting an administrator that the temporary credential has been used; a format for an alert message alerting the administrator of the approaching communication time-limit; a format for an alert message alerting the administrator of the impending expiration of an instance of the temporary credential profile; a capability limit for the client defining what capabilities are available to the client under the temporary credential; and any other information that is useful for a temporary credential profile.

In a further variation, the authentication-field includes sub-fields, wherein each sub-field can include: a user name; a password; a packet sequence number of a last packet received by the client from the server; a packet sequence number of a last packet sent by the client to the server; and an Internet Protocol address of the client.

In a variation of this embodiment, the system initiates the server by creating an instance of a temporary credential profile from a temporary credential profile template, wherein the temporary credential profile provides instructions to the server to be executed in the event that the server receives the temporary credential from the client. The system then configures the instance of the temporary credential profile, wherein configuring the instance of the temporary credential profile involves specifying values for the fields of the temporary credential profile.

In a variation of this embodiment, the temporary credential can include a session key, wherein the session key is obtained from the server after the client is authenticated using a permanent credential, or any other authentication-indicator obtained from the server, wherein an authentication-indicator indicates that the client was previously authenticated using a permanent credential.

In a further variation, securing access to the permanent credential may involve: deleting the permanent credential; supplying the permanent credential to a third-party authentication service; encrypting the permanent credential; obfuscating the permanent credential; and any other method of securing the permanent credential.

In a further variation, the temporary credential can only be used once.

DETAILED DESCRIPTION

Figure 1:
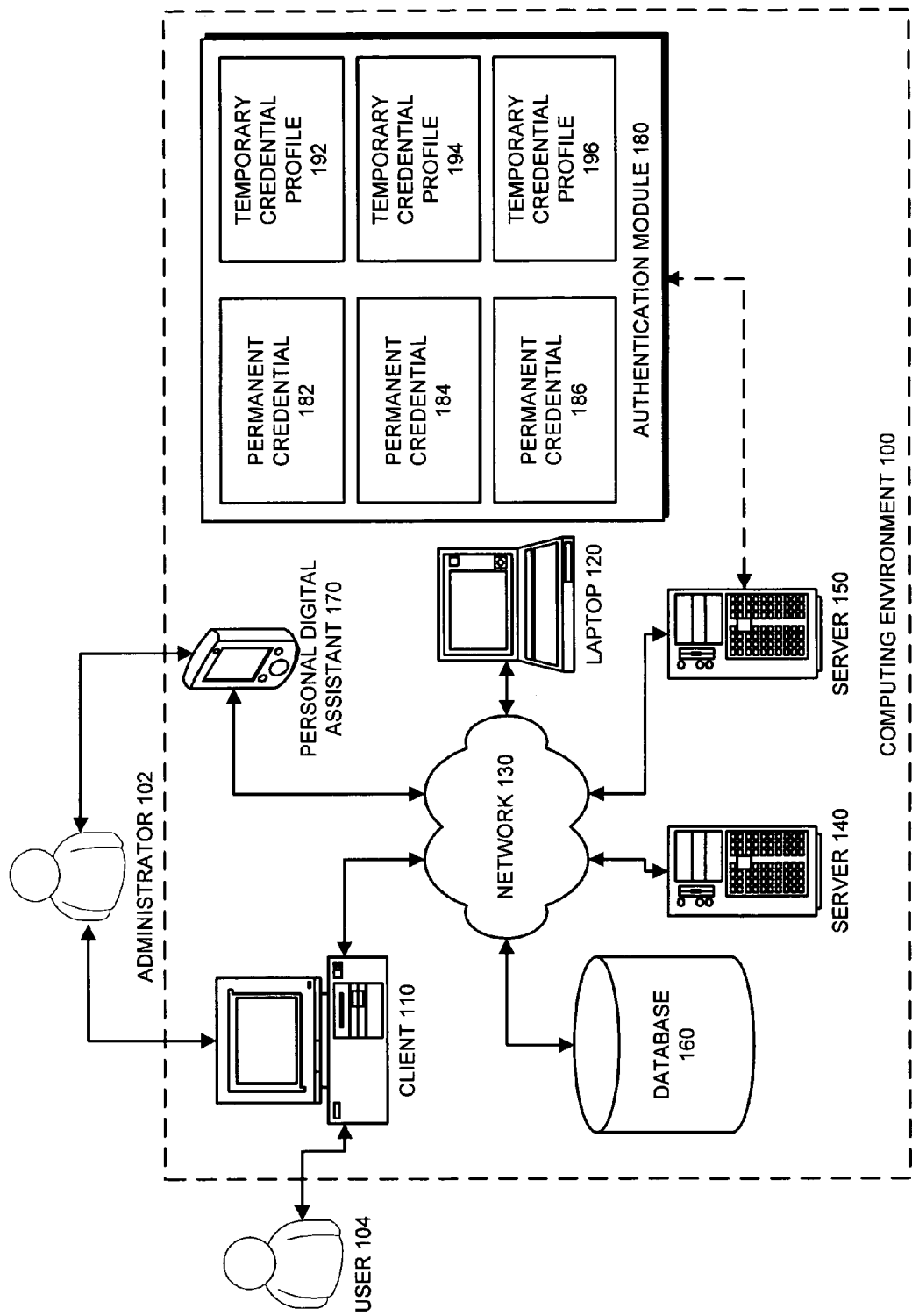
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

The present invention provides a method for re-establishing communication between a client, and a server. Note that the term "server" as used in the instant application can generally include any computational node including a mechanism for servicing requests from a client for computational and/or data storage resources. Typically, when there is an unplanned loss of communication between a client and a server, an administrator will diagnose what caused the loss of communication, make necessary repairs or adjustments to the client and/or the server, and then re-establish communication between the client and the server. The term "administrator" as used in the instant application can generally include any privileged individual who has permission to setup and configure clients and servers. If an administrator is not available when communication is lost, users typically must wait until an administrator is available before communication can be restored. The term "user" in the instant application refers to individuals who are not administrators.

In general, an administrator is required to restore communication between a client and a server because, in most cases, modern systems require authentication of a client or an individual to protect against unauthorized activity. To help reduce the possibility of unauthorized activity, the privileges required to restore communication between the client and the server are typically not granted to a user.

There is a trade-off between availability and security. Requiring authentication increases the level of security of a computer system. However, when a loss of communication occurs, authentication can hinder availability. One embodiment of the present invention decreases the trade-off between availability and security by using temporary credentials. When using a temporary credential, a user who does not have the authorization level of an administrator can restore communication between a client and a server after an unexpected loss of communication. The capabilities granted to a client that has been authenticated with a temporary credential is limited compared to the capabilities granted to a client that has been authenticated with a permanent credential. Note that the capabilities granted to a client that has been authenticated with a temporary credential are typically a subset of the capabilities granted to a client that has been authenticated with a permanent credential. However, having a client with limited capabilities is often preferred over downtime. For example, the ability of an organization to take product orders while the organization is temporarily unable to process those orders is typically preferred to the inability to take and process product orders. Note that a permanent credential is a credential that grants a client a complete set of capabilities and can be used more than once. In contrast, a temporary credential typically limits one or more of the following: the set of capabilities; the length of time a capability is available; and the number of uses of a capability.

In one embodiment of the present invention, the temporary credential can be used permanently and does not ever expire.

In one embodiment of the present invention, the capabilities granted to a client that has been authenticated with a temporary credential are the same as the capabilities granted to a client authenticated with a permanent credential.

In one embodiment of the present invention, the administrator creates a temporary credential profile, wherein the temporary credential profile includes information that specifies: the capabilities that are granted to a client that has been authenticated using the temporary credential; how long the client can communicate with the server before a permanent credential must be supplied by the client; and an alert message to send to an administrator informing the administrator that a temporary credential was used to authenticate a client to the server.

If a client loses communication with a server, a user supplies the temporary credential directly, or via a client, to the server in order to re-establish communication between the client and the server. Providing that there are no further unexpected losses of communication, the re-established communication between the client and the server lasts until an administrator is able to fully restore communication between the client and the server by providing a permanent credential, or until the expiration of the temporary credential.

In one embodiment of the present invention, the client supplies the temporary credential to the server without any actions by the user to re-establish communication between the client and the server. In this embodiment the process is fully automated.

In one embodiment of the present invention, each administrator has his or her own permanent credential. In this embodiment, a client may need a particular permanent credential to fully restore communication with a server.

Computing Environment

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, laptop 120, server 140, server 150, database 160, and personal digital assistant 170, all of which communicate via network 130.

Server 140, server 150 and database 160 each include an authentication module. Note that FIG. 1 only illustrates the authentication module included within server 150 (authentication module 180). Note that the dashed line in FIG. 1 connecting authentication module 180 to server 150 is used to illustrate that authentication module 180 is included within server 150.

In one embodiment of the present invention, authentication module 180 is an external system and is not included within server 150.

Authentication module 180 includes permanent credential 182, 184, and 186. Authentication module 180 also includes temporary credential profile 192, 194, and 196.

Client 110 and laptop 120 can generally include any node on a network 130 including computational capability and including a mechanism for communicating across the network 130.

Servers 140 and 150 can generally include any nodes on a computer network 130 including a mechanism for servicing requests from a client 110 for computational and/or data storage resources.

Database 160 can generally include any type of system for storing data in non-volatile storage. This includes, but is not limited to, systems based upon magnetic, optical, and magneto-optical storage devices, as well as storage devices based on flash memory and/or battery-backed up memory.

Personal digital assistant 170 can generally include any hand-held device including computational ability. This includes, but is not limited to, cellular phones, digital personal organizers, and personal electronic devices.

Authentication module 180 can generally include any type of module that performs authorization, or authentication of a user or a transaction. Network 130 can generally include any type of wired or wireless communication channel capable of coupling together computing nodes. This includes, but is not limited to, a local area network, a wide area network, or a combination of networks. In one embodiment of the present invention, network 130 includes the Internet.

In one embodiment of the present invention, administrator 102 authenticates client 110 to server 150 by providing permanent credential 182 to server 150 via client 110. After client 110 authenticates with permanent credential 182, server 150 grants client 110 the capability to read from and write to files that are stored on server 150.

When client 110 loses communication with server 150, client 110 attempts to re-establish communication with server 150. This attempt to re-establish communication with server 150 can happen automatically, or in response to a request by user 104. Next, client 110 authenticates to server 150 by providing a temporary credential to server 150. If the temporary credential is valid as determined by the rules in temporary credential profile 192, which was created by administrator 102, communication between client 110 and server 150 is re-established. In one embodiment of the present invention, after communication is re-established, server 150 grants client 110 the capability to read from files stored on server 150, but not the capability to write to files stored on server 150. The reduced capabilities granted to client 110 are defined in temporary credential profile 192. Note that in one embodiment of the present invention, the capabilities granted to client 110 are not reduced, but are the same capabilities granted under permanent credential 182.

In one embodiment of the present invention, the temporary credential is a session key, or any other authentication-indicator that is provided by server 150 to client 110 after client 110 is authenticated to server 150 using permanent credential 182.

In one embodiment of the present invention, once client 110 has been authenticated to server 150 by using a temporary credential, server 150 sends an alert message (confirming that client 110 has authenticated to server 150 using a temporary credential) to personal digital assistant 170 which is owned by administrator 102. Note that the alert message can be sent to any administrator who has been specified in temporary credential profile 192.

Temporary Credential Profile Template

Figure 2:
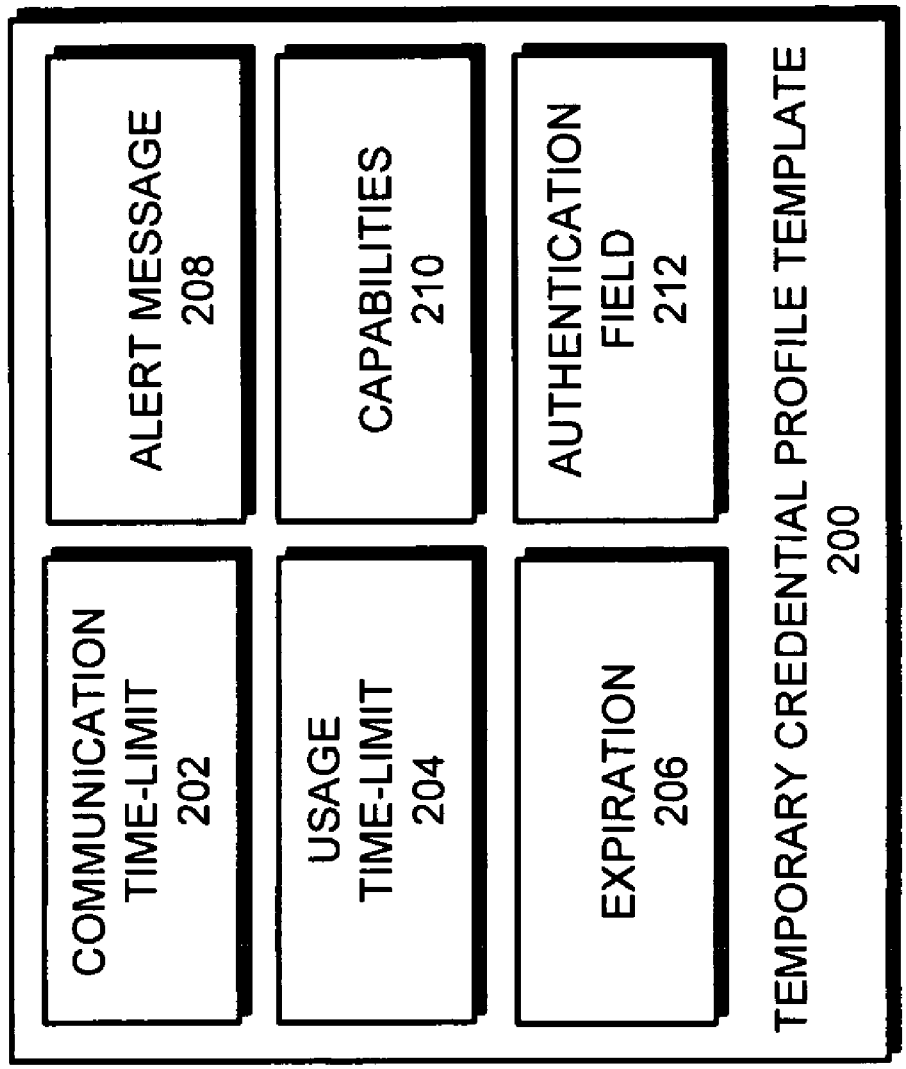
FIG. 2 illustrates a temporary credential profile template in accordance with an embodiment of the present invention.

FIG. 2 illustrates a temporary credential profile template 200 in accordance with an embodiment of the present invention. Temporary credential profile template 200 is created by an administrator, and includes communication time-limit 202, usage time-limit 204, expiration 206, alert messages 208, capabilities 210, and authentication requirement 212.

In one embodiment of the present invention, the administrator uses temporary credential profile template 200 to create an instance of a temporary credential profile. Only an administrator has the capability to create temporary credential profile template 200, and only an administrator has the capability to create an instance of the temporary credential profile. The administrator defines all the fields of the temporary credential profile template when creating a temporary credential profile which is then stored in the authentication module 180. In one embodiment of the present invention, the administrator who creates temporary credential profile template 200 is a different administrator than the administrator who creates the temporary credential profile.

Communication time-limit 202 specifies a length of time that a client can communicate with a server. In one embodiment of the present invention, communication time-limit 202 is specified in terms of a number of operations.

Usage time-limit 204 specifies how soon the temporary credential must be used to re-establish communication between a client 110 and a server 150 after an unexpected termination of communication between the client 110 and the server 150. After communication is unexpectedly terminated between the client 110 and the server 150, if the client 110 has not used the temporary credential to re-establish communication with the server 150 in the amount of time specified in usage time-limit 204, then the server 150 will no longer accept the temporary credential.

Expiration 206 specifies the length of time a temporary credential profile is valid after it is created. Once a temporary credential profile has expired, the temporary credential matching the temporary credential profile will no longer be accepted by the authentication module owning the temporary credential profile and the client will no longer be able to re-establish communication with the server using the temporary credential matching the temporary credential profile. If a temporary credential profile has expired, an administrator can create a new instance of the temporary credential profile from temporary credential profile template 200. In one embodiment of the present invention, an administrator can manually expire a temporary credential profile at any point in time.

In one embodiment of the present invention, the temporary credential is a single-use credential. Once the temporary credential has been used, both the temporary credential and the temporary credential profile are retired. The administrator can create a new temporary credential profile by instantiating a new instance of the temporary credential profile from temporary credential profile template 200.

Alert message 208 defines: the content of an alert; who should receive the alert; how the alert should be transmitted; and when the alert should be sent. Alert message 208 can alert an administrator to: the usage of a temporary credential; the expiration of the temporary credential profile; the approaching communication time-limit; or any other alert the administrator deems important. Alert message 208 can be transmitted by telephone, electronic mail, instant message, mail, system specific alert service or any other communication method familiar to those in the art.

In one embodiment of the present invention, alert message 208 is not utilized, or does not exist. In this embodiment an alert is not sent to the administrator.

Capabilities 210 specifies what capabilities are granted to a client who authenticates with the temporary credential profile. Typically, capabilities 210 is a subset of the capabilities granted to the client authenticating with a permanent credential.

In one embodiment of the present invention, authentication field 212 specifies what authentication-information the authentication module 180 requires from a client 110 authenticating with a temporary credential. Authentication field 212 can include: a user name; a password; a packet sequence number of the last packet received by the client 110 from the server 150; a packet sequence number for the last packet sent by the client 110 to the server 150; an Internet Protocol address of the client 110; a time of communication termination; and any other information that can be used for authenticating the client 110 and proving that the client 110 was communicating with the server 150 prior to the unexpected loss of communication.

Note that in one embodiment of the present invention, for an authentication module 180 to authenticate the client 110, the authentication module 180 must be able to determine that the client 110 had previously been authenticated with a permanent credential. The temporary credential cannot be used to establish initial communication between a client 110 and a server 150. The temporary credential can only be used to re-establish communication between the client 110 and the server 150.

Generally, a temporary credential can be used by a greater set of users than a permanent credential, thus potentially reducing downtime of a resource because there are a greater number of users that can re-establish communication between a client and a server. For example, a company usually employs far fewer administrators than general users, thus if all general users are authorized to use temporary credentials, and only administrators are authorized to use permanent credentials, then there will be far more users that can re-establish communication between a client and a server than there are users that can establish initial communication between a client and a server. In one embodiment of the present invention, the combination of authentication requirement 212, communication time-limit 202, usage time-limit 204, expiration 206, authentication requirement 212, alert message 208, the limited capabilities of capabilities 210, and that a temporary credential is only valid for one use facilitates in maintaining the security of the server.

Server Configuration

Figure 3:
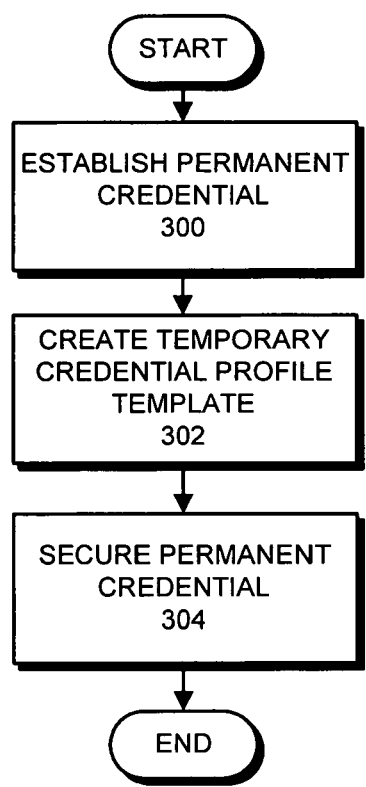
FIG. 3 presents a flowchart illustrating the process of configuring a server in accordance with an embodiment of the present invention.

FIG. 3 presents a flowchart illustrating the process of configuring a server in accordance with an embodiment of the present invention. The process begins when an administrator establishes a permanent credential (step 300). The permanent credential is a credential that must be provided by a client 110 to establish initial communication with a server 150. In general, the permanent credential can include any credential used to authenticate one system to another, such as a cryptographic password. Furthermore, the permanent credential can be used multiple times to authenticate the client 110 to the server 150. Moreover, multiple clients may be able to use the permanent credential.

Next, the administrator creates a temporary credential profile template (step 302). This temporary credential profile template specifies what information is required to create a temporary credential profile.

The administrator then secures access to the permanent credential (step 304). This can be accomplished by: deleting the permanent credential; obfuscating the permanent credential; or any other method of securing the permanent credential such that only an administrator can obtain access to a permanent credential.

Note that in one embodiment of the present invention, step 304 occurs after a client 110 authenticates itself to the server 150 using a temporary credential.

Server Initialization

Figure 4:
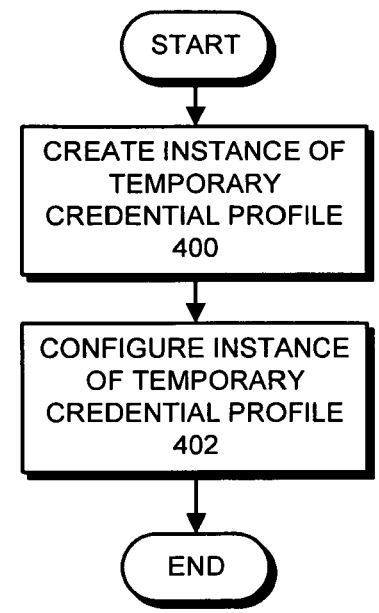
FIG. 4 presents a flowchart illustrating the process of initializing a server in accordance with an embodiment of the present invention.

FIG. 4 presents a flowchart illustrating the process of initializing a server 150 in accordance with an embodiment of the present invention. The process begins when an administrator creates an instance of a temporary credential profile (step 400). The temporary credential profile is created from a temporary credential profile template 200. The administrator then configures the instance of the temporary credential profile (step 402). Configuring an instance of a temporary credential profile involves specifying values for each of the fields defined by the administrator who created the temporary credential profile template 200. Note that the creator of the temporary credential profile template 200 and the creator of the instance of the temporary credential profile template 200 are not necessarily the same administrator. However, both the temporary credential profile template 200 and the temporary credential profile are created by an administrator.

After a temporary credential profile has been created and configured, a client 110 can provide a temporary credential to re-establish communication with a server 150 provided that all the conditions of the temporary credential profile are met.

System Operation

Figure 5:
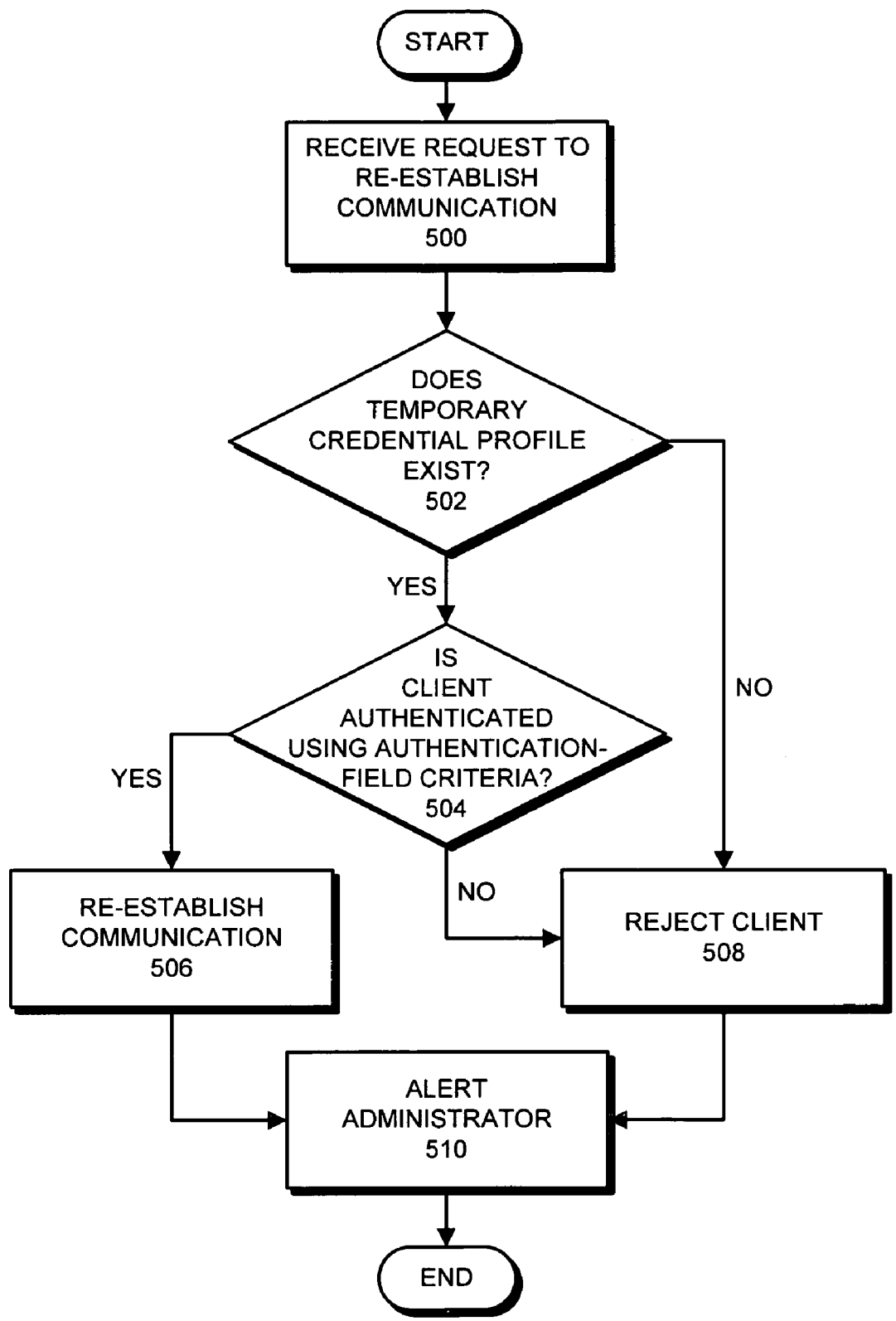
FIG. 5 presents a flowchart illustrating the operation of a server in accordance with an embodiment of the present invention.

FIG. 5 presents a flowchart illustrating the operation of a system in accordance with an embodiment of the present invention. The process begins when a server 150 receives a request from a client 110 to re-establish communication, wherein the request includes a temporary credential (step 500). The authentication module 180 of the server 150 receiving the request to re-establish communication determines if the temporary credential is valid. Determining if the temporary credential is valid involves identifying whether a temporary credential profile exists (step 502), and if so, authenticating the client 110 using the criteria specified in the authentication-field of the temporary credential profile (step 504). If the temporary credential is valid, the server 150 re-establishes communication with the client 110 (step 506). If not, or if a temporary credential profile does not exist, the server 150 rejects the request from the client 110 to re-establish communication (step 508). In both cases the server 150 sends an alert informing the administrator of an attempt to use a temporary credential (step 510).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for re-establishing communication between a client and a server after termination of communication, wherein the computer includes a processor, the method comprising:
    establishing, at the server, initial communication with the client based on a permanent credential;
    providing a temporary credential to the client, wherein the temporary credential:
        cannot be used to establish initial communication with the client;
        limits the client's capability to access data on the server; and
        includes an authentication-indicator indicating that the client was authenticated using the permanent credential;
    detecting a termination of communication with the client; and
    re-establishing communication between the client and the server, based on the temporary credential, received from the client.

2. The method of claim 1, further comprising initializing the server by:

creating an instance of a temporary credential profile from a temporary credential profile template, wherein the temporary credential profile provides instructions to the server to be executed in the event that the server receives the temporary credential from the client; and configuring the instance of the temporary credential profile, wherein configuring the instance of the temporary credential profile involves specifying values for the fields of the temporary credential profile.

3. The method of claim 1, wherein the temporary credential includes:
   a session key, wherein the session key is obtained from the server after the client is authenticated using a permanent credential.

4. A non-transitory computer-readable storage medium storing instructions that when executed by a computer cause the computer to perform a method for re-establishing communication between a client and a server after termination of communication, the method comprising:
   establishing, at the server, initial communication with the client based on a permanent credential;
   providing a temporary credential to the client, wherein the temporary credential:
      cannot be used to establish initial communication with the client;
      limits the client's capability to access data on the server; and
      includes an authentication-indicator indicating that the client was authenticated using the permanent credential;
   detecting a termination of communication with the client; and
   re-establishing communication between the client and the server, based on the temporary credential, received from the client.

5. The computer-readable storage medium of claim 4, further comprising initializing the server by:
   creating an instance of a temporary credential profile from a temporary credential profile template, wherein the temporary credential profile provides instructions to the server to be executed in the event that the server receives the temporary credential from the client; and
   configuring the instance of the temporary credential profile, wherein configuring the instance of the temporary credential profile involves specifying values for the fields of the temporary credential profile.

6. The computer-readable storage medium of claim 4, wherein the temporary credential includes:
   a session key, wherein the session key is obtained from the server after the client is authenticated using a permanent credential.

7. An apparatus for re-establishing communication between a client and a server after termination of communication, comprising:
   a processor;
   a memory;
   a communication-establishing mechanism configured to establish, at the server, initial communication with the client based on a permanent credential;
   a credential-providing mechanism configured to provide a temporary credential to the client, wherein the temporary credential:
      cannot be used to establish initial communication with the client;
      limits the client's capability to access data on the server; and
      includes an authentication-indicator indicating that the client was authenticated using the permanent credential;
   detecting a termination of communication with the client; and
   a communication re-establishing mechanism configured to re-establish communication between the client and the server, based on the temporary credential, received from the client.

8. The apparatus of claim 7, further comprising a server initiation mechanism configured to initiate the server by:
   creating an instance of a temporary credential profile from a temporary credential profile template, wherein the temporary credential profile provides instructions to the server to be executed in the event that the server receives the temporary credential from the client; and
   configuring the instance of the temporary credential profile, wherein configuring the instance of the temporary credential profile involves specifying values for the fields of the temporary credential profile.

9. The method of claim 1, further comprising configuring the server by:
   generating the permanent credential, which is used to determine whether the client is authorized to establish communication with the server;
   creating a temporary credential profile template; and
   securing access to the permanent credential so that the permanent credential is restricted to a subset of users.

10. The method of claim 9, wherein the temporary credential profile template which includes one or more of:
   a communication time-limit defining how long communication can last before requiring the client to use the permanent credential to authenticate with the server;
   a usage time-limit defining how soon the temporary credential must be used after the unexpected termination of communication;
   an expiration value defining how long a temporary credential profile is valid before a new temporary credential profile must be created;
   an authentication-field defining what authentication-information must be provided by the client attempting to re-establish communication when using the temporary credential;
   a format for an alert message alerting an administrator that the temporary credential has been used;
   a format for an alert message alerting the administrator of the approaching communication time-limit;
   a format for an alert message alerting the administrator of the impending expiration of an instance of the temporary credential profile; and
   a capability limit for the client defining what capabilities are available to the client under the temporary credential.

11. The method of claim 10, wherein the authentication-field includes sub-fields which includes:
   a user name;
   a password;
   a packet sequence number of the last packet received by the client from the server;
   a packet sequence number of the last packet sent by the client to the server; and
   an Internet Protocol address of the client.

12. The method of claim 9, wherein securing access to the permanent credential involves:
   deleting the permanent credential;
   supplying the permanent credential to a third-party authentication service;

encrypting the permanent credential; and
obfuscating the permanent credential.

13. The method of claim 9, wherein the temporary credential can only be used once and the permanent credential can be used more than once.

14. The computer-readable storage medium of claim 4, further comprising configuring the server by:
   generating the permanent credential, which is used to determine whether the client is authorized to establish communication with the server;
   creating a temporary credential profile template; and
   securing access to the permanent credential so that the permanent credential is restricted to a subset of users.

15. The computer-readable storage medium of claim 14, wherein the temporary credential profile template which includes one or more of:
   a communication time-limit defining how long communication can last before requiring the client to use the permanent credential to authenticate with the server;
   a usage time-limit defining how soon the temporary credential must be used after the unexpected termination of communication;
   an expiration value defining how long a temporary credential profile is valid before a new temporary credential profile must be created;
   an authentication-field defining what authentication-information must be provided by the client attempting to re-establish communication when using the temporary credential;
   a format for an alert message alerting an administrator that the temporary credential has been used;
   a format for an alert message alerting the administrator of the approaching communication time-limit;
   a format for an alert message alerting the administrator of the impending expiration of an instance of the temporary credential profile; and
   a capability limit for the client defining what capabilities are available to the client while the temporary credential is in use.

16. The computer-readable storage medium of claim 15, wherein the authentication-field includes sub-fields which includes:
   a user name;
   a password;
   a packet sequence number of the last packet received by the client from the server;
   a packet sequence number of the last packet sent by the client to the server; and
   an Internet Protocol address of the client.

17. The computer-readable storage medium of claim 14, wherein securing access to the permanent credential involves:
   deleting the permanent credential;
   supplying the permanent credential to a third-party authentication service;
   encrypting the permanent credential; and
   obfuscating the permanent credential.

18. The computer-readable storage medium of claim 14, wherein the temporary credential can only be used once and the permanent credential can be used more than once.

19. The apparatus of claim 7, further comprising a server configuration mechanism configured to configure the server by:
   generating the permanent credential, which is used to determine whether the client is authorized to establish communication with the server;
   creating a temporary credential profile template; and
   securing access to the permanent credential so that the permanent credential is restricted to a subset of users.

20. The apparatus of claim 19, wherein the server configuration mechanism is further configured to secure access to the permanent credential by:
   deleting the permanent credential;
   supplying the permanent credential to a third-party authentication service;
   encrypting the permanent credential; and
   obfuscating the permanent credential.

* * * * *